(12) United States Patent
Huang et al.

(10) Patent No.: US 9,933,821 B2
(45) Date of Patent: Apr. 3, 2018

(54) CHASSIS WITH LOCK MECHANISM

(71) Applicant: Quanta Computer Inc., Taoyuan (TW)

(72) Inventors: Jen-Hsuen Huang, Taoyuan (TW); Fa-Da Lin, Taoyuan (TW); Chih-Wei Yu, Taoyuan (TW); Chih-Wei Yang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 133 days.

(21) Appl. No.: 15/045,957

(22) Filed: Feb. 17, 2016

(65) Prior Publication Data

US 2017/0235696 A1    Aug. 17, 2017

(51) Int. Cl.
*G06F 13/40* (2006.01)
*G06F 1/16* (2006.01)
*G06F 1/18* (2006.01)
*G06F 11/14* (2006.01)
*G06F 1/28* (2006.01)
(Continued)

(52) U.S. Cl.
CPC ............ *G06F 1/1679* (2013.01); *G06F 1/181* (2013.01); *G06F 1/182* (2013.01); *G06F 1/185* (2013.01); *G06F 1/186* (2013.01); *G06F 1/28* (2013.01); *G06F 11/1456* (2013.01);
(Continued)

(58) Field of Classification Search
CPC ......... G06F 1/1679; G06F 1/185; G06F 1/186
USPC ....... 361/607, 609, 615, 726, 732, 740, 747, 361/759; 710/301, 302
See application file for complete search history.

(56) References Cited

U.S. PATENT DOCUMENTS 5,386,567 A * 1/1995 Lien ................... G06F 9/4411
                                                         710/302
6,151,346 A  11/2000 Partlo et al.
(Continued)

FOREIGN PATENT DOCUMENTS

JP    H9-331170 A    12/1997
JP    2003-228544 A    8/2003
(Continued)

OTHER PUBLICATIONS

Taiwanese Office Action for Application No. 105113808, dated Apr. 26, 2017, w/ First Office Action Summary.
(Continued)

*Primary Examiner* — Glenn A Auve
(74) *Attorney, Agent, or Firm* — Nixon Peabody LLP; Eduardo J. Quinones; Zhou Lu (57) ABSTRACT

An apparatus may include a chassis that can receive a sled and a locking mechanism. The locking mechanism can mechanically lock the sled to the chassis to prevent a sudden power loss that can be caused from an unexpected removal of the sled from the chassis. To avoid a sudden power loss, a voltage-sensing electrical switch lock can be implemented to the chassis to mechanically lock the sled to the chassis until the sled is ready to be removed. The sled may include one or more computing devices that need to be inactive before removing the sled. The apparatus includes a controller that may detect whether at least one of computing devices in the sled are in an active state or in an inactive state. Based on the determination of the state of the computing devices in the sled, the controller may activate the locking mechanism or de-active locking mechanism.

21 Claims, 6 Drawing Sheets

(51) Int. Cl.
*G06F 21/00* (2013.01)
*H05K 7/14* (2006.01)

(52) U.S. Cl.
CPC .......... *G06F 13/4068* (2013.01); *G06F 21/00* (2013.01); *H05K 7/1485* (2013.01); *G06F 2201/84* (2013.01)

(56) References Cited

U.S. PATENT DOCUMENTS

| | | | | |
|---|---|---|---|---|
| 6,175,491 | B1 * | 1/2001 | Park | G06F 1/183 361/679.57 |
| 6,312,275 | B1 * | 11/2001 | Tortorella | H01R 13/6395 361/759 |
| 6,549,969 | B1 * | 4/2003 | Hsu | E05B 17/22 310/325 |
| 6,553,444 | B1 * | 4/2003 | Holmquist | H03K 17/94 710/301 |
| 6,806,591 | B2 * | 10/2004 | Goers | G06F 13/4081 307/134 |
| 7,239,522 | B2 * | 7/2007 | Rust | G06F 1/183 361/732 |
| 7,328,297 | B2 * | 2/2008 | Chu | G06F 1/12 709/227 |
| 2003/0097507 | A1 * | 5/2003 | Lin | G06F 13/28 710/302 |
| 2005/0081074 | A1 | 4/2005 | Chheda et al. | |
| 2013/0032310 | A1 | 2/2013 | Jaena et al. | |

FOREIGN PATENT DOCUMENTS

| | | |
|---|---|---|
| JP | 2009-169876 A | 7/2009 |
| TW | I145801 | 11/1990 |
| WO | 2014142234 A1 | 9/2014 |

OTHER PUBLICATIONS

Taiwanese Search Report for Application No. 105113808 (report conducted Mar. 28, 2017) mailed with First Office Action dated Apr. 26, 2017.
Japan Office Action for Application No. JP 2017-025856, dated Oct. 24, 2017, with Office Action Summary.
Extended European Search Report for EP Application No. 17156575.7, dated Jun. 8, 2017.

* cited by examiner

CHASSIS WITH LOCK MECHANISM

FIELD OF THE INVENTION

This application relates to managing a server device, and more particularly to a method of preventing data loss for the server device using a lock mechanism.

BACKGROUND

In traditional chassis system architecture, a chassis system includes at least one power source and one or more sleds that work individually and independently of each other. The power source may be configured to supply the required power to operate computing devices within the sleds. Sometimes, a sled needs to be replaced or repaired due to the failure of one or more of the computing devices in the sled. Therefore, an assembly technician will mechanically remove the sled from the chassis for repair or replacement of the failed computing device. The problem with this approach is that the assembly technician may not know whether the sled is ready to be removed. Alternatively, the assembly technician may pull out the sled prematurely during a shutdown operation. As a result, when the assembly technician mistakenly pulls the sled out of from the chassis while the sled is operating, a data loss may occur due to the sudden power loss to the computing devices within sled.

SUMMARY OF THE INVENTION

The following presents a simplified summary of one or more embodiments in order to provide a basic understanding of present technology. This summary is not an extensive overview of all contemplated embodiments of the present technology, and is intended to neither identify key or critical elements of all examples nor delineate the scope of any or all aspects of the present technology. Its sole purpose is to present some concepts of one or more examples in a simplified form as a prelude to the more detailed description that is presented later.

In accordance with one or more aspects of the examples described herein, systems and methods are provided for preventing a power loss using a voltage-sensing electrical switch lock in a server system. The apparatus includes a sled including one or more computing devices, a chassis configured for receiving the sled, and at least one locking mechanism configured for mechanically locking the sled to the chassis. The apparatus further includes a controller for the locking mechanism, wherein the controller is configured for detecting whether at least one of computing devices in the sled are in an active state or in an inactive state, in response to detecting that the at least one of the computing devices is in the active state, activating the locking mechanism, and in response to detecting that the at least one of the computing devices are in the inactive state, deactivating the locking mechanism.

Further, the locking mechanism can include at least a solenoid switch that is mounted on the sled for selectively energizing a solenoid, where the solenoid switch includes a switch rod that axially moves in the solenoid. In some embodiments, the controller may be a chassis baseboard management controller (BMC). In another embodiment, the controller may be a sled baseboard management controller (BMC). In yet another embodiment, the controller may be a rack baseboard management controller (BMC).

Moreover, the controller is further configured for actuating the solenoid switch associated with the sled by electrically energizing the solenoid, the energization of the solenoid produces a magnetic force to move the switch rod to be extended and engaged with the sled. The controller is further configured for de-actuating the solenoid switch associated with the sled by electrically de-energizing the solenoid, the de-energization of the solenoid causes the switch rod to be retracted into the solenoid.

In another embodiment, the controller is further configured for performing a data backup process in a memory device of the sled, receiving a notification indicating that the data backup process has been completed, and in response to receiving the notification, deactivating the locking mechanism. In another embodiment, the controller is configured for providing a threshold voltage value to the sled to remain in the active state while the data backup process is being performed.

The apparatus further includes the controller configured for determining a voltage value of the at least one of computing devices in the sled, upon determining the voltage value of the at least one of computing devices are above the threshold voltage value, and determining that the sled is in active state. The apparatus also includes the controller configured for receiving a removal request to mechanically disconnect the sled from the chassis.

In another aspect, a method is provided for preventing a power loss. The method includes detecting whether at least one of computing devices in a sled are in an active state or in an inactive state, in response to detecting that the at least one of the computing devices is in the active state, activating a locking mechanism, and in response to detecting that the at least one of the computing devices are in the inactive state, deactivating the locking mechanism.

In yet another aspect, a non-transitory computer-readable medium is provided for preventing a power loss in a server system. The non-transitory computer-readable medium stores executable instructions when executed by a system controller, cause the system controller to perform operations including detecting whether at least one of computing devices in a sled are in an active state or in an inactive state, in response to detecting that the at least one of the computing devices is in the active state, activating a locking mechanism, and in response to detecting that the at least one of the computing devices are in the inactive state, deactivating the locking mechanism.

BRIEF DESCRIPTION OF THE DRAWINGS

Various embodiments in accordance with the present disclosure will be described with reference to the drawings, in which.

DETAILED DESCRIPTION

Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects. The word "exemplary" is used herein to mean "serving as an example, instance, or illustration." Any embodiment described herein as "exemplary" is not necessarily to be construed as preferred or advantageous over other embodiments.

Figure 1:
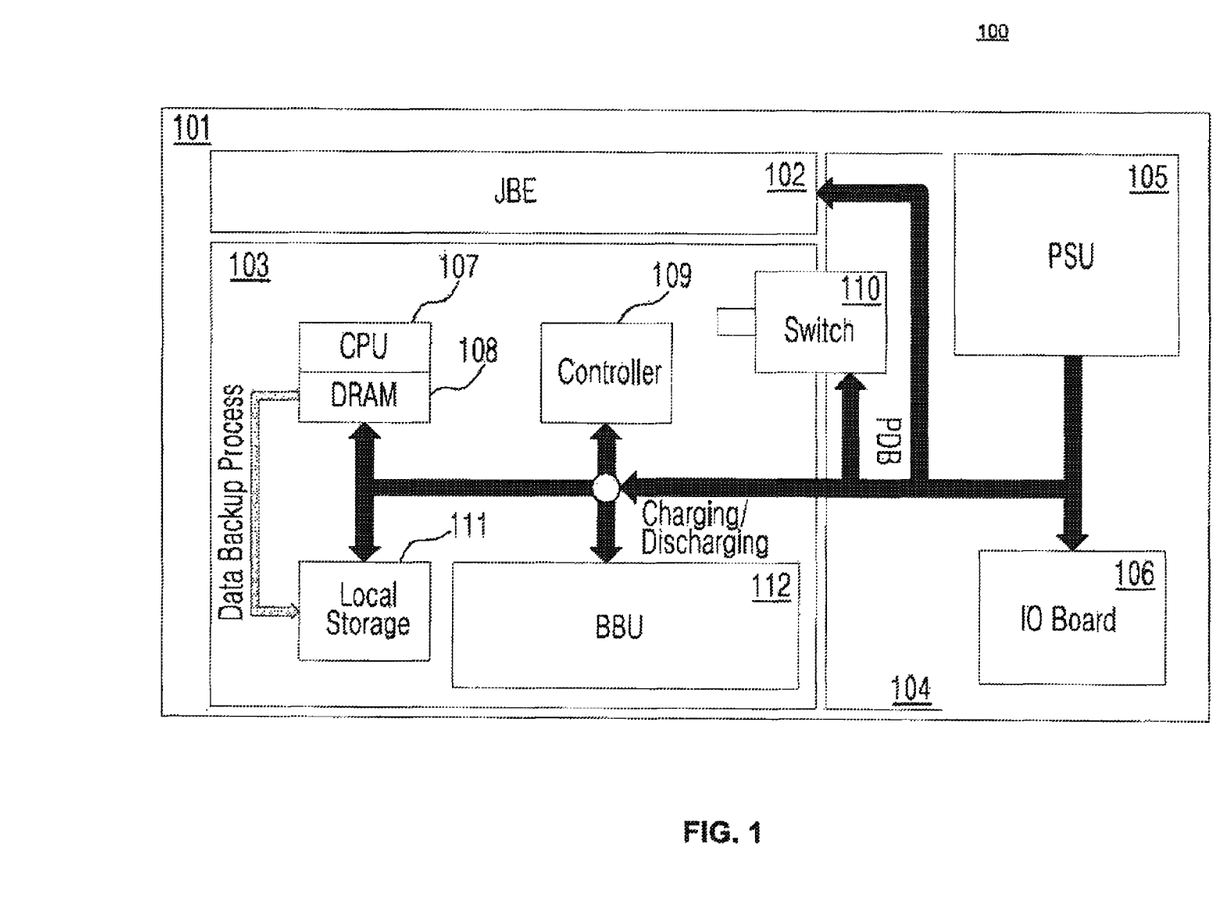
FIG. 1 illustrates a block diagram of exemplary embodiments of preventing a power loss in a server system.

The subject disclosure provides techniques for preventing data loss by using a lock mechanism for sleds in a chassis. The disclosure turns first to FIG. 1, which illustrates a block diagram 100 of exemplary embodiment of a chassis system configured for preventing data loss. As shown in the block diagram 100, a chassis 101 is provided, which is an assembly of supporting components designed to be individually mounted to the rack system. It provides structure and power flow to a plurality of sled units and other electrical subsystems. As shown in FIG. 1, chassis 101 can include a removable sled 103, a power supply unit (PSU) 105, an I/O (Input/output) board 106, a JBOD Enclosure (JBE) 102, a power distribution board (PDB) 104, and a switch lock 110. JBOD (Just a Bunch of Disks/Drivers) is a collection of hard disks or a hard disk enclosure for several disks.

As shown in FIG. 1, the PSU 105 or the BBU (Back-up Battery Unit) 112 supplies power to operate the components in the chassis 101, including the sled 103, I/O board 106, JBE 102, and switch 110. Power distribution is provided via the power distribution board (PDB) 104 which receives power from the PSU 105 and distributes it to the above-mentioned components.

The sled 103 can include a number of different components. For example, as shown in the exemplary configuration of FIG. 1, a sled 103 can include a controller 109, a BBU 112, a CPU 107, RAM 108, and a local storage device 111. However, the present disclosure also contemplates that a sled can include more or less components than shown in FIG. 1.

As noted above, the sled can include, aside from the CPU 107, RAM 108, and local storage device 111, a BBU 112 to address power supply interruptions to the sled 103 due to a failure of the PSU 105, the PDB 104, or components there between incase of such sudden power loss, the BBU 112 may provide the secondary power for the components in the sled 103 to operate or to at least shutdown in a safe state. For example, the BBU 112 may be charging while the sled 103 is powered by the PDB 104 and stores the necessary amount of power to keep the components in the sled 103 active during a data back-up operation. Such components include at least the RAM 108, the local storage device 111 or the CPU 107. The BBU 112 may retain enough power for the sled 103 to last from a few minutes to a few hours.

The sled 103 can also include, as noted above, a controller 109. The controller 109 can be service or management processor (e.g., a baseboard management processor) that operates independently of the CPU 107 to support management tasks for the server. For example, the controller 109 can be a baseboard management controller (BMC) configured to provide out-of-band management/administration of the sled 103.

As noted above, the sled 103 is removable from the chassis 101 and provided with a latch system that locks the sled in place when fully inserted. For repair or replacement of any components in the sled 103, the assembly technician may remove the sled 103 from the chassis 101 or disconnecting the sled 103 from the PDB 104 by manually pulling the sled 103 out of the chassis 101. The sled 103 may also have one or more connectors (not shown) that engage with one or more corresponding connectors (not shown) in the PDB 104 when the sled 103 is inserted into the chassis 101. In some configurations, the sled 103 may be "hot-swappable". That is, the sled 103 can be removed and reinserted into the chassis 101 without requiring that the chassis 101 be powered down.

As noted above, the present technology provides for including a lock mechanism to prevent sled 103 from being removed from chassis 101 prematurely, i.e., while components in the sled 103 are active. Thus, chassis 101 incorporates a switch lock 110 as one part of the lock mechanism, where the switch lock 110 mechanically locks or secures the sled 103 to the chassis 101 and prevents any unexpected disconnection of the sled 103 from a power source (i.e., PSU 105 and PDB 104). Thus, the switch lock 110 ensures a continuous power delivery to the sled 103 by physically preventing removal of the sled 103 from the chassis 101.

In the present technology, the locking mechanism may also include a sensing system, which can activate or deactivate the switch lock 110. For example, the switch lock 110 can include or be controlled by a voltage sensing system that detects a voltage value in the circuitry and generates a corresponding output signal. Based on the detected voltage value, the voltage sensing system can control the switch lock 110. One exemplary configuration for a locking mechanism will be explained below in detail in connection with the FIG. 2A-FIG. 3B.

In some embodiments, the controller 109 can be part of the voltage sensing system. For example, the controller 109 can be configured to detect whether the sled 103 is active by determining the voltage value of each of the computing devices in the sled 103. When sled 103 is powered from the PSU 105 or BBU 112, the sled 103 is determined to be active. If the controller 109 determines that any of the computing devices is associated with a voltage value higher than a threshold voltage value, then the computing devices are determined to be active and a corresponding signal can be generated to activate the switch lock 110. The threshold voltage value can be pre-determined by the controller 109. Generally, the threshold voltage value is zero, but in some cases, a very minimal residual voltage value can be considered as zero.

In some embodiments, the switch lock 110 is activated to prevent the sled being pulled out of the chassis 101 during the data back-up process or when the server is in a working mode. The switch lock 110 may be deactivated after the data back-up process has been completed or the BBU 112 is fully discharged. The controller 109 can detect the data back-up process. For example, the controller 109 can determine whether the local storage device 111 has already stored an up-to-date data and will start the data backup procedure if the data backup is not up to date. The controller 109 can compare the written data in the local storage device 111 with the data in the RAM 108 and will determine if they are the same. Upon determining that the written data in the local storage device 111 is different from the data in the RAM 108, data stored in the RAM 108 can be copied to the local storage 111 to create the data backup. In some embodiments, the data back-up process can be initiated upon determining a power failure. For example, the PSU AC can be lost and the controller can back up data in the local storage 111. A similar procedure can be utilized to backup state data for the CPU 107.

In some embodiments, upon determining that the data back-up process has been completed, the controller 109 will turn the BBU 112 off to stop the BBU 112 from being discharged. Once the data backup is stored at the local storage device 111, a notification can be generated to indicate that the data back-up process has been completed and the sled 103 is ready for removal. The notification can be sent to the I/O board 106 or an administrative device. The switch lock 110 can be deactivated when the notification is generated, so the assembly technician can easily and safely remove the sled.

In some embodiments, the notification may be a light notification. For example, each sled can be associated with a light device that is visible from outside the chassis 101 or sled 103. The light notification can be a flashing Light-Emitting Diode (LED) light to attract the assembly-technician's attention. In other embodiments, the notification may be a sound notification. For example, a beeping sound. Thus, when the locking mechanism is deactivated, a particular beeping sound can be played to indicate a corresponding locking status of the sled 103.

Figure 2A:
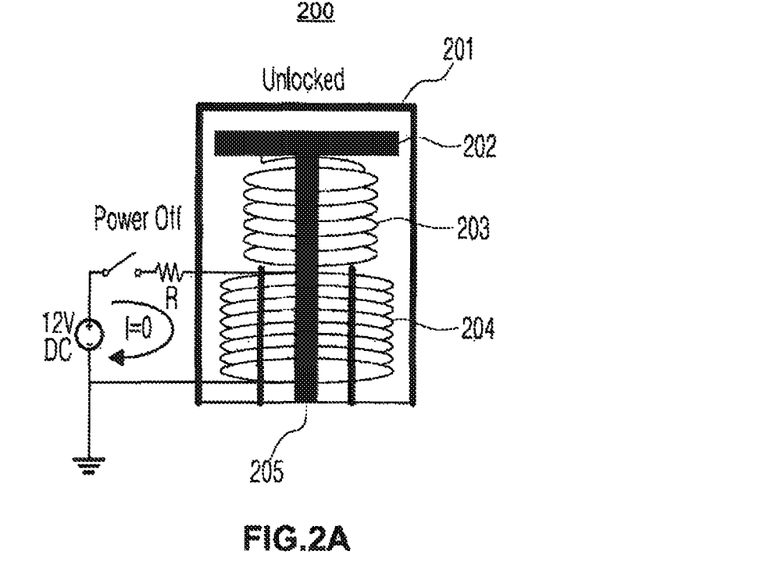
FIG. 2A and FIG. 2B illustrate exemplary switch lock configurations when the switch lock inactivated.
Figure 2B:
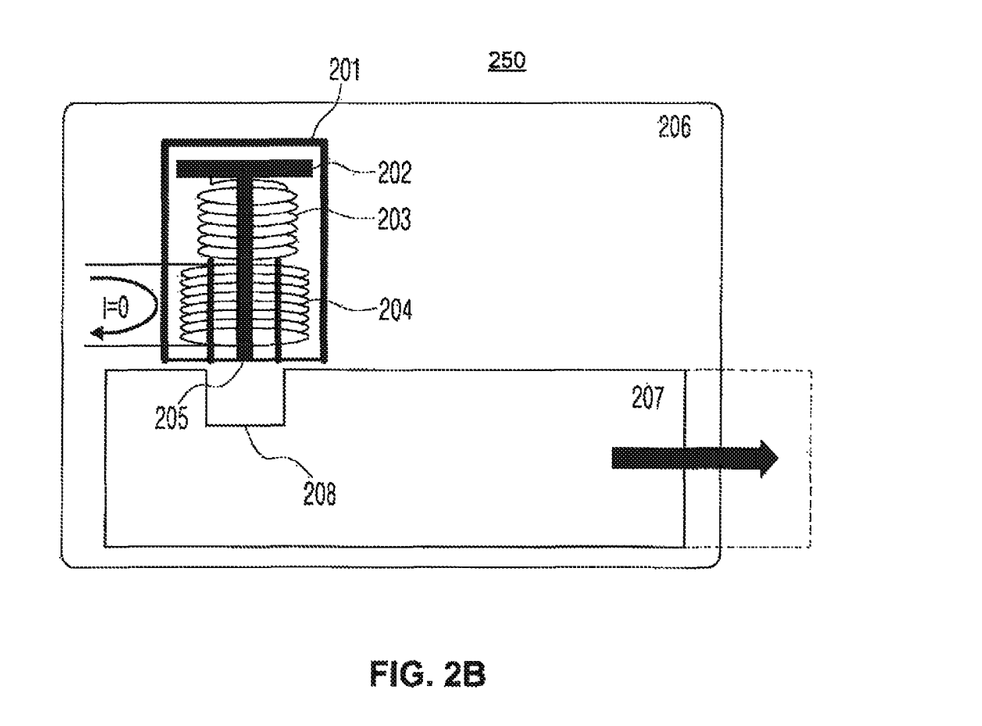

FIGS. 2A and 2B illustrate exemplary switch lock configuration when the switch lock is deactivated (i.e. locking mechanism is inactive). Especially, FIG. 2A illustrates an exemplary configuration 200 when the switch lock is deactivated, and FIG. 2B illustrates an exemplary configuration 250 of the inactivated switch lock in connection with the sled and the chassis. As shown in FIG. 2A, the switch lock may be a Solenoid switch type. A Solenoid switch type can convert electric energy into a magnetic linear motion. For example, a Solenoid switch typically includes a coil wound into a tightly packed helix. The coil is often wrapped around a volume of space, where a magnetic field is generated within. The magnetic field can be generated by activating electric current in the coil. The generated magnetic field may be a pointing magnetic force in a linear direction based on the flow direction of electric current. In some embodiments, the pointing magnetic force is strong enough to move the actuating rod, which is surrounded by the coil, in a designated direction.

For example, the Solenoid switch in FIG. 2A includes a housing 201 that houses armature 202, spring 203, coil 204, and actuating rod 205. The armature 202 may be a revolving structure in electric motor/generator wound with coils that can carry the current. The actuating rod 205 can be a long metallic rod that can be pushed out of the housing 201 by the generated magnetic force. The actuating rod 205 can be vertically attached to the armature 202. The armature 202 and the actuating rod 205 are attached the housing 201 through the spring 203. The spring 203 can facilitate the movement of the armature 202 and the actuating rod 205.

As illustrated in FIG. 2A, the sled 207 may include a depression, hole, opening, or other receiving feature 208 that can receive the actuating rod 205 when the actuating rod 205 is pushed out of the housing 201 by the magnetic force. When an electric current does not pass through the coil 204 (e.g. indicated as 'I=0') the switch lock is turned off. In particular embodiments, the electric current can be controlled directly or indirectly by the voltage sensing system being employed. For example, the signal from controller 109 indicating whether or not components in the sled are active can be used to control whether or not a current is supplied. However, the present disclosure contemplates that any other way of controlling the current can be used.

When the electric current does not pass through the coil, there is no magnetic force applied to the actuating rod 205 to overcome the force of the spring 203 and the actuating rod 205 will stay in the housing 201 and not extend into the receiving feature 208. Thus, the sled 207 can be taken out of the chassis 206.

Figure 3A:
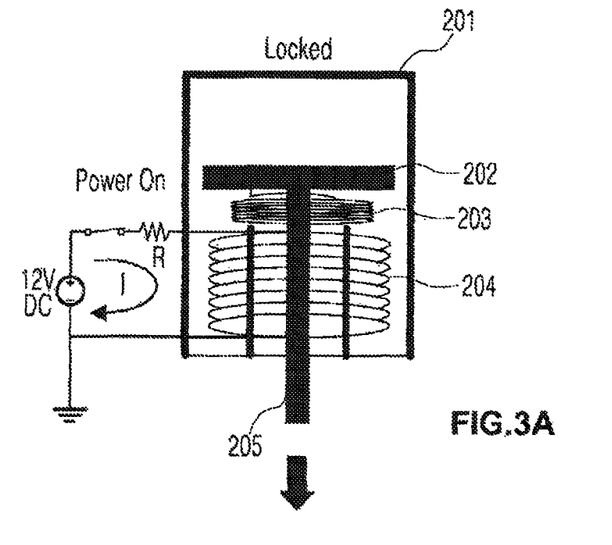
FIG. 3A and FIG. 3B illustrate exemplary switch lock configurations when the switch lock activated.
Figure 3B:
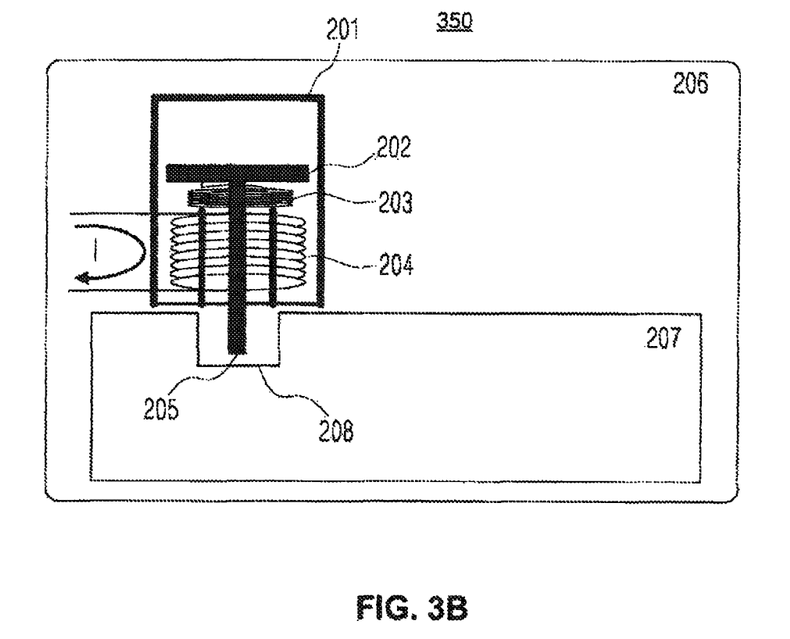

FIGS. 3A and 3B illustrate exemplary configuration when the switch lock is activated (i.e. locking mechanism is activated). Especially, FIG. 3A illustrates an exemplary configuration 300 when the switch lock is activated, and FIG. 3B illustrates an exemplary configuration 350 of the activated switch lock in connection with the sled and the chassis. As shown in FIG. 3A, a switch lock includes a housing 201 that receive armature 202, spring 203, coil 204, and actuating rod 205. When electricity flows thorough the coil 204 (e.g. indicated as 'I'), the switch is turned on and a magnetic force will be generated in the designated direction (i.e. a downwards direction). The magnetic force is applied to the actuated rod 205 to overcome the force of the spring 203, which pushes the armature 202 downwards, as shown in FIG. 3A. Thus, the actuating rod 205 will protrude from the housing 201 and into the receiving feature 208 of the sled 207. The engagement of the actuating rod 205 with the sled 207 thus prevents a removal of the sled 207 from the chassis 206 by a physical force of the technician.

Although above, the Solenoid type switch was described for purpose of explanation of one or more aspects, numerous other types of switches can be used to lock the sled to the chassis. For example, any electric, magnetic, or mechanical switches can be used without limitation.

Further, although FIGS. 1, 2A, 2B, 3A, and 3B illustrate that the switch lock is separate from the sled, the present disclosure also contemplates that the switch lock can also be implemented as part of the sled to secure the sled to the chassis. Further, all functions of the locking mechanism can be configured to be internal to the sled.

In some embodiments, the switch lock can also be configured to be associated with other components in the chassis that work with the sled. Thus, even if the sled is not currently active, its removable may be prevented if an associated components in the chassis is still active.

In still other embodiments, a single sled can have more than one switch locks. Each of the switch lock is communicable and compatible with each other and thus, if one switch lock fails, the switch locks can be synchronized and the other switch locks can take over. In some configurations, the different switch locks may be controlled separately and activated or deactivated based on different conditions. Thus, the sled would only be removable if and when the different conditions are concurrently met.

Further, although the exemplary configuration is directed to managing removal of a sled, the various embodiments are not limited in this regard. The present disclosure also contemplates that similar locking mechanism can be utilized with other types of components in the chassis. For example, premature removal of a PSU, a JBE, or other components can be prevented by using such locking mechanisms.

Figure 4A:
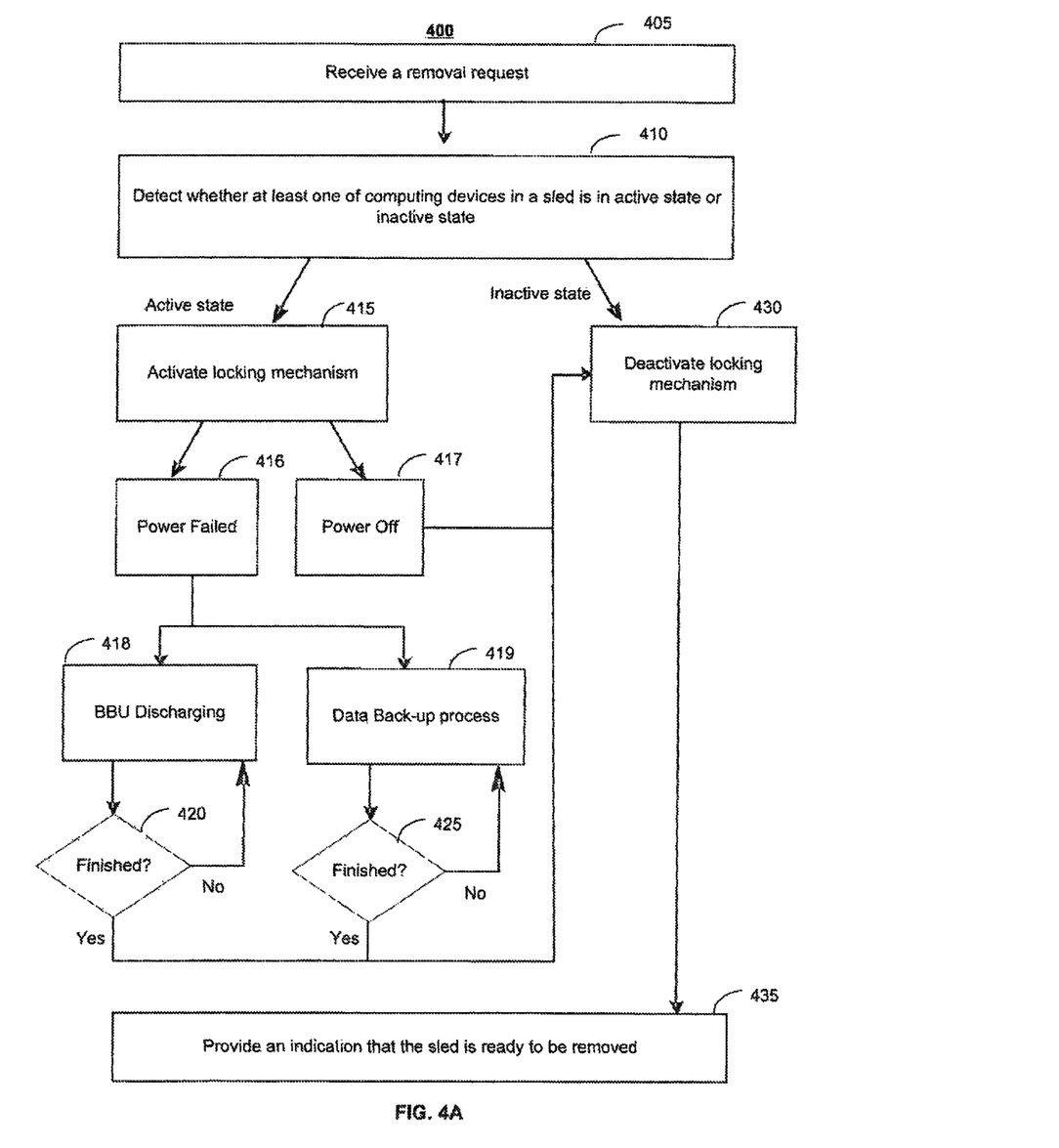
FIG. 4A and FIG. 4B illustrate flow charts of an exemplary method of preventing a power loss in a server system.

FIG. 4A is a flow chart 400 of an exemplary method of preventing a power loss in a server system. At step 405, a controller may receive a removal request to mechanically disconnect the sled from the chassis from an administrative device. For example, the administrative device can detect an input from the technician through the I/O board that the technician needs to remove the sled from the chassis in order to replace or repair the sled. In particular configurations, a button or other control device can be activated to request removal of the sled. The administrative device can transmit the removal request to the controller. At step 410, the controller may detect whether at least one of computing devices in the sled is in active state or inactive state. As described above, the sled may include at least one or more computing devices that are necessary for operation of the sled such as BBU, CPU, RAM, or controller. All of the computing devices need to be turned off in order to safely take the sled out of the chassis. Thus, the controller may detect whether at least one of the computing devices are in inactive state to determine whether the lock mechanism needs to be activated.

At step 415, upon determining that at least one of the computing devices are in the active state, the controller may activate the locking mechanism to mechanically lock the sled to the chassis to prevent an improper removal of the sled from the chassis. At step 430, upon determining that at least one of the computing devices are in the inactive state, the controller may not active the locking mechanism, as it is safe to remove the sled from the chassis.

In some embodiments, upon the controller determining that power is off at step 417, the locking mechanism can be deactivated at step 430 to allow the technician to remove the sled from the chassis. When the controller determines that the power source has failed at step 416, the data back-up process may start at step 419. When the data back-up process is completed at step 425, the locking mechanism can be inactivated at step 430 to allow the technician to remove the sled from the chassis. The BBU may be discharging at step 418 to supply necessary power for the data back-up process while the data back-up process is in progress. If the BBU is fully discharged at step 420 before the data back-up process is completed, the locking mechanism become deactivated. If the BBU is not fully discharged even the data back-up process is completed, the sled will remain active and the locking mechanism will remain activated until the BBU is fully discharged to the end.

At step 435, an indication is provided to the technician notifying that the sled is ready to be removed. For example, as discussed above, a visual or audio indication can be provided.

The present disclosure also contemplates that in some configurations, a technician may disconnect the chassis from a power supply or remove or deactivate a PSU prior to removing a sled. However, in certain case, the sled may be in the middle of an operation that needs to be backed-up before the sled is removed. Accordingly, the present disclosure contemplates that a BBU can be leveraged to prevent premature removal of the sled in these cases. This is illustrated with respect to FIG. 4B.

Figure 4B:
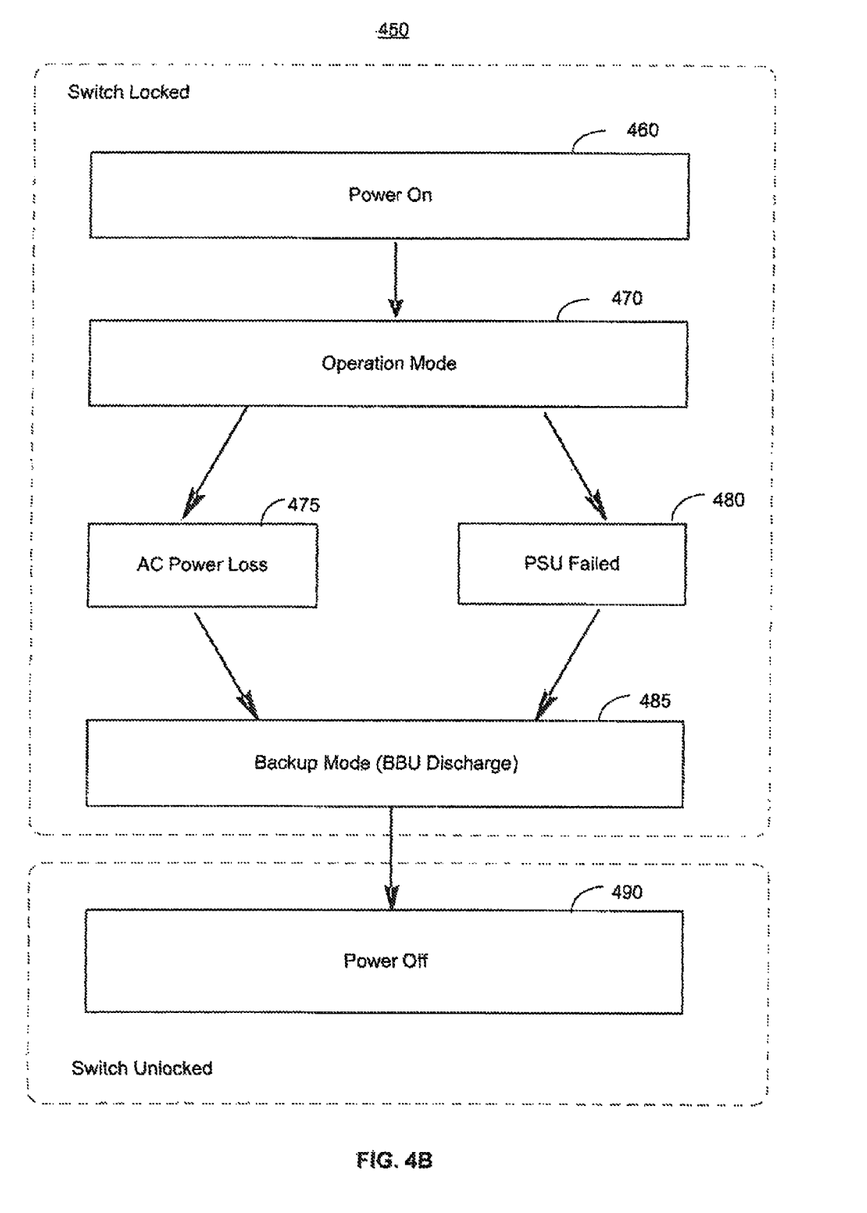

FIG. 4B is a detailed flow chart 450 of an exemplary method of activating the locking mechanism using the BBU. At step 460, the chassis (and the sled) are powered on and the switch lock is activated. At step 470, the sled can enter an operation mode to perform any tasks the sled is configured to perform, i.e., performing normal operations.

At steps 475 and 480, the chassis is concurrently monitored for AC power loss (475) or a PSU failure (480) or any other type of external power loss event for the sled. In the event of such an external power loss event, the sled can switch to a backup mode at step 485. During the back-up mode, data back-up operations can be performed, where the BBU can be discharged to supply necessary power for the data back-up operations. Moreover, during this period, the lock switch can be maintained active to prevent premature removal of the sled and thus any data loss. For example, the switch lock can be operated using power supplied by the BBU.

At step 490, after the data back-up operation is completed, the components in the sled can be powered off. The controller may determine whether the sled is inactive by determining that all the computing devices in the sled are powered off. Further, the lock switch can be deactivated and removal of the sled can be performed. In some cases, an indication notifying that the lock mechanism is inactivated and the sled can be removed can be provided to the assembly-technician as described above. On other cases, the BBU can be sized such that sufficient power is stored therein to supply power to the sled and the switch lock for at least a time necessary to complete backup operations. Thus, when the BBU is discharged and the switch is deactivated by loss of power from the BBU, the sled can be safely removed.

Figure 5:
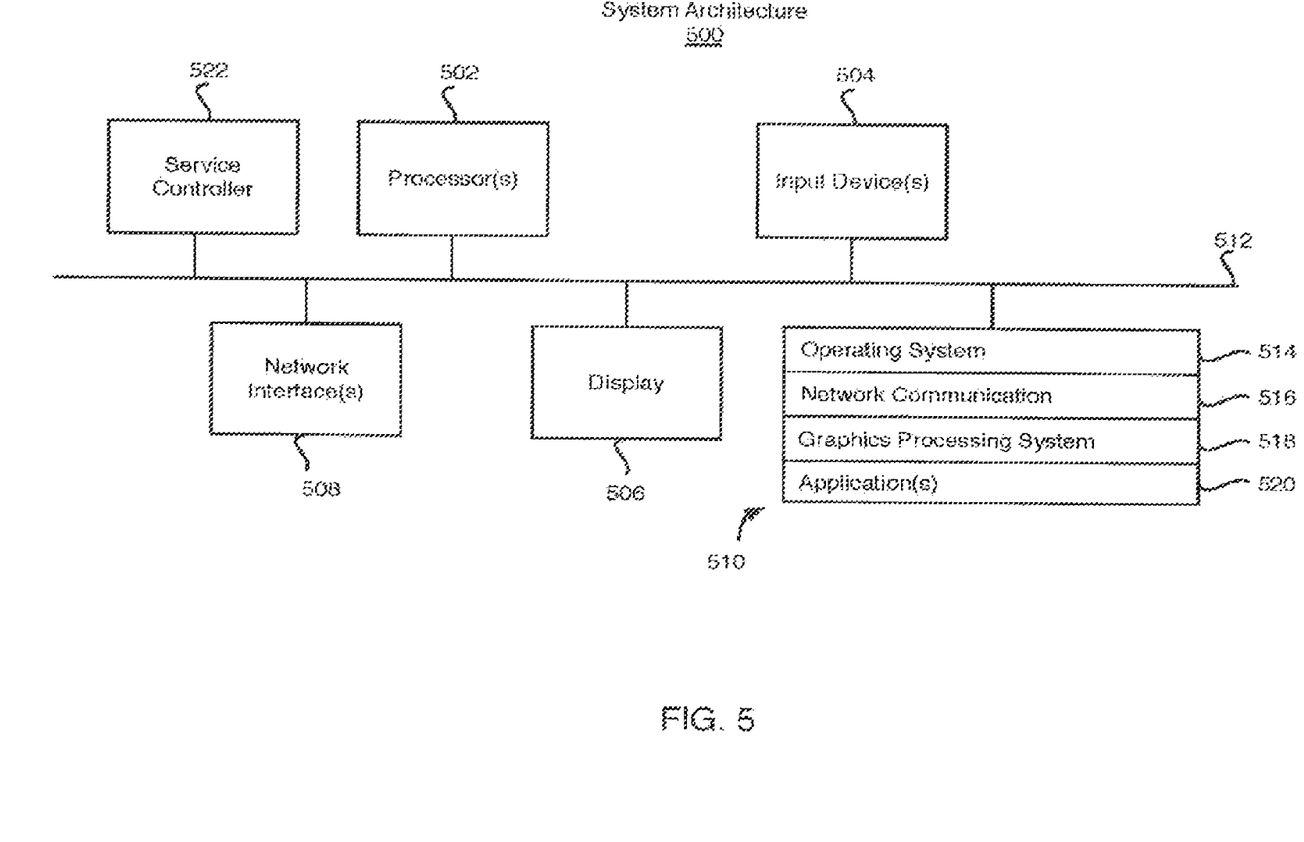
FIG. 5 illustrates a block diagram of an exemplary computer system.

FIG. 5 is a block diagram of exemplary system architecture 500 implementing the features and processes of FIGS. 1-4. The architecture 500 can be implemented on any electronic device that runs software applications derived from compiled instructions, including without limitation personal computers, servers, smart phones, media players, electronic tablets, game consoles, email devices, etc. In some implementations, the architecture 500 can include one or more processors 502, one or more input devices 504, one or more display devices 506, one or more network interfaces 508 and one or more computer-readable mediums 510. Each of these components can be coupled by bus 512.

Display device 506 can be any known display technology, including but not limited to display devices using Liquid Crystal Display (LCD) or Light Emitting Diode (LED) technology. Processor(s) 502 can use any known processor technology, including but are not limited to graphics processors and multi-core processors. Input device 504 can be any known input device technology, including but not limited to a keyboard (including a virtual keyboard), mouse, track ball, and touch-sensitive pad or display. Bus 512 can be any known internal or external bus technology, including but not limited to ISA, EISA, PCI, PCI Express, NuBus, USB, Serial ATA or FireWire.

Computer-readable medium 510 can be any medium that participates in providing instructions to processor(s) 502 for execution, including without limitation, non-volatile storage media (e.g., optical disks, magnetic disks, flash drives, etc.) or volatile media (e.g., SDRAM, ROM, etc.). The computer-readable medium (e.g., storage devices, mediums, and memories) can include, for example, a cable or wireless signal containing a bit stream and the like. However, when mentioned, non-transitory computer-readable storage media expressly exclude media such as energy, carrier signals, electromagnetic waves, and signals per se.

Computer-readable medium 510 can include various instructions 514 for implementing an operating system (e.g., Mac OS®, Windows®, Linux). The operating system can be multi-user, multiprocessing, multitasking, multithreading, real-time and the like. The operating system performs basic tasks, including but not limited to: recognizing input from input device 504; sending output to display device 506; keeping track of files and directories on computer-readable medium 510; controlling peripheral devices (e.g., disk drives, printers, etc.) which can be controlled directly or through an I/O controller; and managing traffic on bus 512. Network communications instructions 516 can establish and maintain network connections (e.g., software for implementing communication protocols, such as TCP/IP, HTTP, Ethernet, etc.).

A graphics processing system 518 can include instructions that provide graphics and image processing capabilities. Application(s) 520 can be an application that uses or implements the processes described in reference to FIGS. 1-4. The processes can also be implemented in operating system 514.

Service controller 522 can be a controller that operates independently of processor(s) 522 and/or operating system 514. In some implementations, service controller 522 can be powered and operational before processor(s) 502 are powered on and operating system 514 is loaded into processor(s) 502. For example, service controller 522 can provide for pre-OS management of the computing device through a dedicated network interface or other input device. For example, system controller 522 can be a baseboard management controller (BMC) that monitors device sensors (e.g., voltages, temperature, fans, etc.), logs events for failure analysis, provides LED guided diagnostics, performs power management, and/or provides remote management capabilities through an intelligent platform management interface (IPMI), keyboard, video, and mouse (KVM) redirection, serial over LAN (SOL), and/or other interfaces. Service controller 522 can be implement the processes described with reference to FIGS. 1-4 above. For example, service controller 522 can be configured to manage power supply units coupled to server rack 102.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:
1. An apparatus, comprising:
   a sled comprising one or more computing devices;
   a chassis configured for receiving the sled;
   at least one locking mechanism configured for mechanically locking the sled to the chassis; and
   a controller for the locking mechanism, wherein the controller is configured for:

detecting whether the one or more computing devices in the sled are in an active state or in an inactive state;
in response to detecting that at least one of the one or more computing devices is in the active state, activating the locking mechanism;
determining that the apparatus has an A/C power failure;
performing a data backup process in a memory device of the sled;
receiving a notification indicating that the data backup process has been completed; and
deactivating the locking mechanism.

2. The apparatus of claim 1, wherein the locking mechanism comprises at least a solenoid switch mounted on the sled for selectively energizing a solenoid, the solenoid switch comprises a switch rod that axially moves in the solenoid.

3. The apparatus of claim 2, wherein activating the locking mechanism, the controller is further configured for:
actuating the solenoid switch associated with the sled by electrically energizing the solenoid, the energization of the solenoid produces a magnetic force to move the switch rod to be extended and engaged with the sled.

4. The apparatus of claim 2, wherein deactivating the locking mechanism, the controller is further configured for:
de-actuating the solenoid switch associated with the sled by electrically de-energizing the solenoid, the de-energization of the solenoid causes the switch rod to be retracted into the solenoid.

5. The apparatus of claim 1, wherein in response to detecting that the at least one of the computing devices is in the active state, activating the locking mechanism, the controller is further configured for:
performing a data backup process in a memory device of the sled;
receiving a notification indicating that the data backup process has been completed; and
in response to receiving the notification, deactivating the locking mechanism.

6. The apparatus of claim 5, wherein in response to detecting that the at least one of the computing devices is in the active state, activating the locking mechanism, the controller is further configured for:
providing a threshold voltage value to the sled to remain in the active state while the data backup process is being performed.

7. The apparatus of claim 1, wherein detecting whether the at least one of computing devices in the sled are in the active state or in the inactive state, the controller is further configured for:
determining a voltage value of the at least one of computing devices in the sled;
determining the voltage value of the at least one of computing devices is above a threshold voltage value; and
determining that the sled is in active state.

8. The apparatus of claim 1, wherein the controller is further configured for: receiving a removal request to mechanically disconnect the sled from the chassis.

9. The apparatus of claim 1, wherein the controller is a chassis baseboard management controller (BMC).

10. The apparatus of claim 1, wherein the controller is a sled baseboard management controller (BMC).

11. The apparatus of claim 1, wherein the controller is a rack baseboard management controller (BMC).

12. A method, comprising:
detecting whether computing devices in a sled of a chassis are in an active state or in an inactive state;
in response to detecting that at least one of the computing devices is in the active state, activating a locking mechanism;
determining that the chassis has an A/C power failure;
performing a data backup process in a memory device of the sled;
receiving a notification indicating that the data backup process has been completed; and
deactivating the locking mechanism.

13. The method of claim 12, wherein activating the locking mechanism, comprising:
actuating a solenoid switch associated with the sled by electrically energizing a solenoid, the energization of the solenoid produces a magnetic force to move a switch rod to be extended and engaged with the sled.

14. The method of claim 12, wherein deactivating the locking mechanism, comprising:
de-actuating the solenoid switch associated with the sled by electrically de-energizing the solenoid, the de-energization of the solenoid causes the switch rod to be retracted into the solenoid.

15. The method of claim 12, further comprising:
performing a data backup process in a memory device of the sled;
receiving a notification indicating that the data backup process has been completed; and
in response to receiving the notification, deactivating the locking mechanism.

16. A non-transitory computer-readable medium storing instructions which, when executed by a system controller, cause the system controller to perform operations comprising:
detecting whether computing devices in a sled of a chassis are in an active state or in an inactive state;
in response to detecting that at least one of the computing devices is in the active state, activating a locking mechanism;
determining that the chassis has an A/C power failure;
performing a data backup process in a memory device of the sled;
receiving a notification indicating that the data backup process has been completed; and
deactivating the locking mechanism.

17. The non-transitory computer-readable medium of claim 16, wherein the instructions, when executed, further cause the system controller to perform operations comprising:
providing a threshold voltage value to the sled to remain in the active state while a data backup process is being performed.

18. The non-transitory computer-readable medium of claim 16, wherein the instructions, when executed, further cause the system controller to perform operations comprising:
determining a voltage value of the at least one of computing devices in the sled;
determining that the voltage value of the at least one of computing devices is above a threshold voltage value; and
determining that the sled is in active state.

19. The non-transitory computer-readable medium of claim 16, wherein the instructions, when executed, further cause the system controller to perform operations comprising:

receiving a removal request to mechanically disconnect the sled from the chassis.

20. The non-transitory computer-readable medium of claim 16, wherein the system controller is a basement management controller (BMC).

21. An apparatus, comprising:
- a sled comprising one or more computing devices;
- a chassis configured for receiving the sled;
- at least one locking mechanism configured for mechanically locking the sled to the chassis; and
- a controller for the locking mechanism, wherein the controller is configured for:
  - detecting whether the one or more computing devices in the sled are in an active state or in an inactive state;
  - in response to detecting that at least one of the one or more computing devices is in the active state, activating the locking mechanism;
  - determining voltage values of the one or more computing devices in the sled;
  - determining that a voltage value of one computing device of the one or more computing devices is above the threshold voltage value; and
  - determining that the sled is in active state.

* * * * *